Dec. 29, 1964  E. J. BRUTTEN ETAL  3,163,557
FINGERPRINTING APPARATUS
Filed July 26, 1962  3 Sheets-Sheet 1

Eugene J. Brutten
Burl B. Gray
Darrell E. Rose
Robert J. Falk,
Inventors.
Koenig, Pope, Anniser and Powers
Attorneys.

Dec. 29, 1964 E. J. BRUTTEN ETAL 3,163,557
FINGERPRINTING APPARATUS
Filed July 26, 1962 3 Sheets-Sheet 2

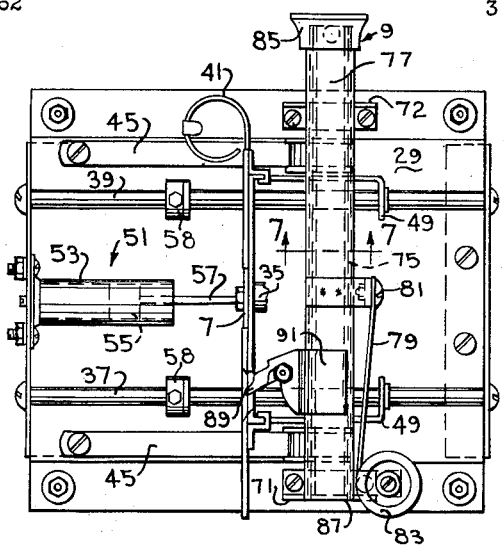

United States Patent Office 3,163,557
Patented Dec. 29, 1964

3,163,557
FINGERPRINTING APPARATUS
Eugene J. Brutten, Burl B. Gray, and Darrell E. Rose, Carbondale, and Robert J. Falk, Skokie, Ill., assignors to Southern Illinois University Foundation, Carbondale, Ill., a corporation of Illinois
Filed July 26, 1962, Ser. No. 212,550
4 Claims. (Cl. 118—11)

This invention relates to fingerprinting apparatus and more particularly to an improved apparatus for recording fingerprints on a strip of translucent material, such as film, the densities of which fingerprints are to be subsequently measured in the so-called palmar sweat method of measuring anxiety.

As noted in co-assigned applications Serial No. 154,467, filed November 24, 1961, and Serial No. 211,519, filed July 23, 1962, both entitled Measurement of Fingerprint Density Apparatus and Method, behavioral scientists have been concerned with devising an objective measure of anxiety. To this end, it was discovered that sensory stimuli indicative of anticipatory apprehension provoked fingertip sweating without affecting a change in general bodily sweating.

This led to the development of a discrete and objective index for measuring anxiety. Procedurally, this measure is based upon the chemical reaction which obtains when perspiration soluble anhydrous ferric chloride, applied to the palmar side of the fingertips, is brought into contact with a tannic acid bearing agent such as a strip of film containing a uniform emulsion saturated with tannic acid. Since the reaction of the anhydrous ferric chloride and tannic acid produces an ink fingerprint which is a dependent function of the extent of finger-tip perspiration, the resulting darkness of the print is considered indicative of the degree of anxiety.

Heretofore, one type of device for obtaining palmar sweat prints included a plate spring-biased upwardly. A strip of film was placed on the plate and the palmar portion of the finger was pressed down on the film. The spring would yield under the finger pressure and at a certain pressure point, for example two pounds pressure, the film carrying plate would engage a stop, thereby giving the operator an indication that sufficient pressure had been applied. After a certain time interval, for example thirty seconds-two minutes, the operator removed his finger from the film, leaving a fingerprint thereon. The density or darkness of the fingerprint was then measured to give an indication of the degree of anxiety.

Considerable difficulty has been encountered with fingerprints produced by this type of fingerprinting device. First, there was no assurance that different operators would push down the film carrying plate with the same pressure, i.e., the density of the fingerprint produced by a person pressing down on the plate with more than the required pressure might differ from the density of the fingerprint produced by a person pressing down on the plate with just the right amount of pressure, although the anxiety of the two persons might be nearly the same. Second, since both the finger and film carrying plate had to be moved to obtain a print, the prints were often smudged and thus rendered inaccurate or useless. It was also difficult for the operator to maintain his finger against any movement during the complete time period. In essence, the usefulness of the fingerprints obtained by this type of device is primarily subject to the operating procedure used by each different operator, and it is difficult to obtain uniform results. The present invention provides apparatus which overcomes the stated difficulties and gives accurate, uniform results.

Among the several objects of the invention may be noted the provision of apparatus which represents an improvement over the apparatus shown in co-assigned application Serial No. 119,517, filed June 26, 1961, issued as U.S. Patent No. 3,083,682 on April 2, 1963, entitled Fingerprinting Apparatus, the improved apparatus having the same objects as the apparatus shown in application Serial No. 119,517, filed June 26, 1961 (now Patent No. 3,083,682), i.e., the provision of an improved apparatus for accurately and objectively recording fingerprints on film or the like for use in measuring anxiety in the practice of the palmar sweat method; the provision of such improved apparatus in which a constant force or pressure is applied to a subject's finger and the print receiving material irrespective of the person operating the apparatus and irrespective of the size, i.e., diameter, of the person's finger; the provision of an improved apparatus of this type which may readily be made portable; and the provision of such apparatus which is of relatively simple construction and easy to operate. Moreover, this improved apparatus has the additional provision of a novel film strip advancing mechanism for advancing the film after a print has been recorded thereon. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention are illustrated, FIG. 1 is a plan view of apparatus of the present invention;

FIG. 5 is a fragmentary plan view similar to FIG. 3 showing certain of the parts which were removed from FIG. 3, other parts being removed for clarity;

FIG. 6 is a side elevation of FIG. 5;

FIG. 7 is a fragmentary vertical section taken on line 7—7 of FIG. 5;

FIG. 11 is an electrical circuit diagram of the apparatus.

Corresponding reference characters indicate corresponding parts through the several views of the drawings.

Figure 1:
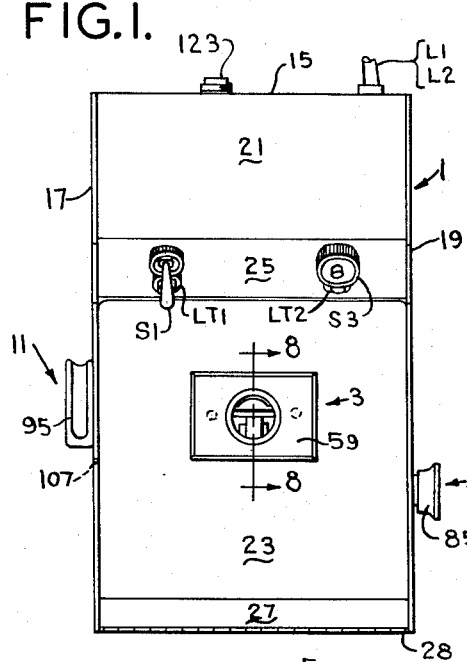

Referring now more particularly to the drawings, apparatus for recording fingerprints on film or the like in accordance with the present invention is shown to comprise a housing or frame 1 in which are located a finger positioning guide 3, a solenoid 5 (FIG. 3), a film or translucent material holder and carriage 7 (FIG. 3), a film advancing mechanism 9 (FIG. 5), a film cutter 11 (FIGS. 1 and 9), and an electrical circuit for operating the apparatus (FIG. 11). Certain of the electrical circuit components are shown at 13 in FIG. 3 as being mounted in the rear end of housing 1. It is to be understood that the term "film" as used herein refers to all types of translucent material upon which a fingerprint may be recorded.

Figure 4:
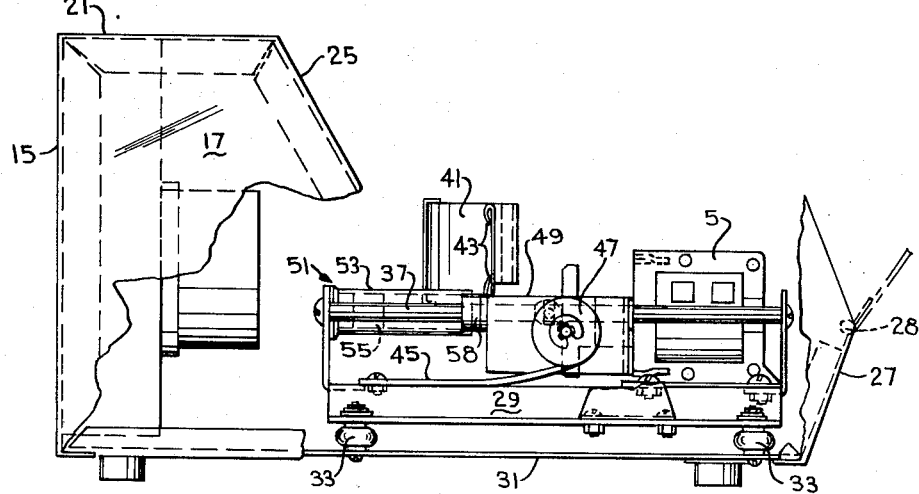
FIG. 4 is a side elevation of FIG. 3 with certain parts removed for clarity.

Housing 1 includes a rear wall 15, two side walls 17 and 19, a first top cover portion 21 and a second top cover portion 23, an inclined front wall portion 25 between top cover portions 21 and 23, and a front wall 27 inclined outwardly and rearwardly from the forward edge of top cover portion 23 (see FIG. 4). Cover portion 23 is hinged as indicated at 28 for permitting access to the interior of the housing 1. Control switches S1 and S3 for the apparatus are mounted on inclined front wall portion 25 and will be described more fully hereinafter with reference to the electrical circuit.

Figure 3:
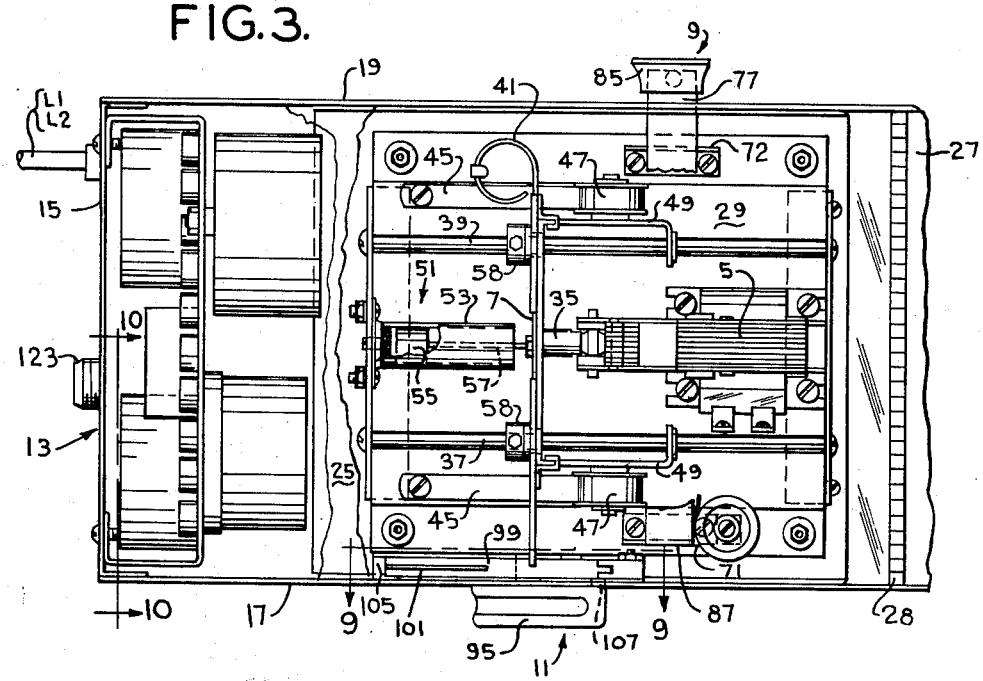
FIG. 3 is a plan view of FIG. 1 with certain parts removed for clarity.

Referring now more particularly to FIGS. 3 and 4, solenoid 5 is shown as being attached to a rectangular four-bar frame 29 which is supported on a bottom plate 31 by cushions 33. A solenoid plunger 35 extends rearwardly from the solenoid and is connected at its rearward end to carriage 7.

Carriage 7 extends transversely across frame 29 and is slidably mounted upon two rails 37 and 39 extending between the end bars of frame 29. A loop 41 is provided on one end of the carriage 7 for holding a roll of film such as 35 millimeter film, for example, which has spaced holes along at least one edge thereof. The upper and lower edges of carriage 7 are turned toward one another as indicated at 43 to provide a guide track for the film. Two springs 45 extend between the rearward end of frame 29 and spools 47 rotatably attached to arms 49 extending from the carriage 7 and slidably mounted on rails 37 and 39. These springs are of a type specially adapted to exert a constant rearward biasing force (to the left as viewed in FIGS. 3 and 4) on carriage 7 within the limits of their working extension from spools 47. It will be seen that springs 45 tend to pull the carriage rearwardly away from the solenoid 5. However, a dash-pot 51 is provided to reduce the velocity with which the springs pull the carriage rearwardly. The dash-pot includes a cylinder 53 secured to the rearward end of frame 29 and a piston 55 connected by a piston rod 57 to the carriage 7. Energization of solenoid 5 causes the carriage 7 to move to the right as viewed in FIG. 3 to a position hereinafter referred to as a retracted position. Deenergization of solenoid 5 permits the springs 45 to pull the carriage rearwardly (to the left as viewed in FIG. 3) to a position hereinafter referred to as a fingerprinting position. Adjustable stops 58 are provided on rails 37 and 39 for preventing the carriage 7 and the film carried thereby from being moved into contact with the guide 3.

Figure 8:
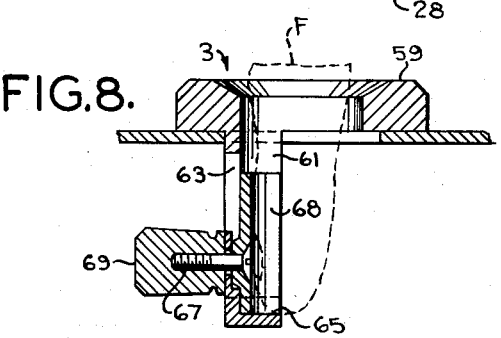
FIG. 8 is a vertical section taken on line 8—8 of FIG. 1, with a finger shown in dotted lines.

The finger positioning guide 3 is shown in FIG. 8 to include a ring 59 located above the hinged top cover portion 23 with a curved surface extension 61 of semicircular cross section extending vertically downward therefrom through an opening in the cover portion 23. Extension 61 is provided with an elongated vertical slot 63. A finger stop 65 is slidably mounted in the slot 63 of extension 61. A screw 67 extends from a curved slide plate 68 (which conforms to the curvature of extension 61) through slot 63 and stop 65. A locking nut 69 is threaded onto screw 67 on the rearward side of the extension 61. The stop 65 determines the lowermost position of the end of a finger F to be fingerprinted and may be moved upwardly and downwardly to position fingers of different sizes and lengths. When the stop 65 is located in the desired position the locking nut 69 is tightened to clamp the stop in place.

The film strip advancing mechanism 9 is shown in FIGS. 5–7. Mechanism 9 is mounted on two legs 71 and 72 fastened to the side bars of frame 29. A bar 73 extends between the legs 71 and 72. Extending across the upper surface of bar 73 is a T-shaped track or rail 75 (FIG. 7). A channel 77 is slidably mounted on track 75. One end of a torsion spring 79 is connected to the channel 77 as indicated at 81 and the other end of the spring 79 is connected to a spool 83 rotatably mounted on leg 71. A knob 85 is attached to the right end of channel 77 (the upper end of the channel 77 as shown in FIG. 5). The knob 85 and channel 77 may be pulled in an outward direction manually and are returned under the action of spring 81. A tab 87 on the lower end of track 75 (as viewed in FIG. 5) limits the return movement of the channel.

A rearwardly extending finger 89 is attached to channel 77 by an arm 91. Finger 89 is mounted for limited pivotal movement on arm 91 and extends rearwardly through an elongate horizontal slot 93 in the carriage 7 when the carriage is in its retracted position. The rearward end of finger 89 is adapted to engage any of the plurality of spaced holes on the lower edge of the film strip. Upon movement of the channel 77 to the right (upwardly as viewed in FIG. 5) the finger 89, due to its angled position and pivotal connection, will not engage any of the holes in the film strip. However, when the knob 85 is released the finger 89 will catch in a hole in the film strip and advance the film strip along guide track 43 and out through an opening 107 in side wall 17 as the channel 77 returns to its normal position. The advancement of the film strip is such that the equivalent of two frames will be advanced and a completely fresh portion of the film will be advanced into alignment with the finger guide so that a new print can be taken.

The film is advanced the equivalent of two frames to provide a clear unprinted portion adjacent a portion having a fingerprint thereon, thereby providing a strip which may be inserted in the apparatus described in application Serial No. 154,467 or application Serial No. 211,519 for measurement of the density of the fingerprint on the strip.

Figure 9:
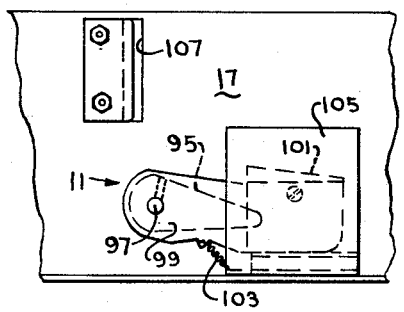
FIG. 9 is a fragmentary side elevation taken on line 9—9 of FIG. 3.

After a portion of the film strip has been advanced the equivalent of two frames as described above it may be cut from the remainder of the strip by the cutter 11. Cutter 11 is shown in FIGS. 1 and 9 to include a handle 95 fixed to a shaft 97 which extends through side wall 17. Attached to shaft 97 on the inside of wall 17 is an arm 99 on the outer end of which is fixed a blade 101. Arm 99 is normally held in its lowermost position by a spring 103. A guide plate 105 confines the lateral movement of arm 99. Counterclockwise movement of handle 95 (as viewed in FIG. 9) causes the blade to move up into engagement with and cut a film strip extending through slot 107 in the side wall 17.

Figure 2:
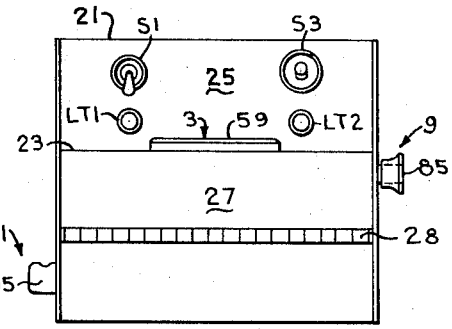
FIG. 2 is a front elevation of FIG. 1.

The electrical circuit (FIG. 11) includes two lines L1 and L2 connected to a source of A.C. power (not shown). A main power switch S1 (FIGS. 1, 2 and 11) is provided in line L1. Connected across lines L1 and L2 are the primary winding PW of a variable transformer T and a light LT1 (FIGS. 1, 2 and 11). A circuit constituted by normally open contact R2A of a relay R2, having a coil RC2, and the coil of solenoid 5 is connected between an adjustable tap 109 of transformer T and line L2. A two r.p.m. motor M and a parallel connected light LT2 (FIGS. 1, 2 and 11) are placed in series with a normally open contact R1B of a relay R1 having a coil RC1 between lines L1 and L2. Motor M controls a switch S2 having a normally closed contact 111 and a normally open contact 113.

Figure 10:
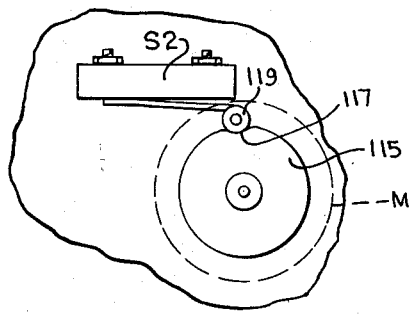
FIG. 10 is a fragmentary elevation taken on line 10—10 of FIG. 3.

Switch S2 is actuated by a cam 115 rotated by motor M (see FIG. 10). Cam 115 has a gradual depression or notch 117 in the periphery thereof. A switch arm follower 119 of switch S2 is normally biased into notch 117. Energization of motor M causes the follower to be moved out of notch 117 thereby actuating switch S2 and upon one revolution of cam 115, i.e., thirty seconds, the follower moves back into notch 117, thereby actuating switch S2 back to its normal position.

Referring again to FIG. 11, one side of the normally closed contact 111 of switch S2 is connected to line L1 by a wire 121. The coil of relay R2 is connected between the other side of normally closed contact 111 and line L2. Also connected between the other side of contact 111 and line L2 is a circuit constituted by a normally open push button switch S3 (FIGS. 1, 2 and 11) and the coil of a relay R1. A normally open contact R1A of relay R1 is connected in shunt with push button switch S3 to form a holding circuit. Wire 121 is also connected to one side of normally open contact 113 of switch S2. The other side of contact 113 is connected to one side of contact R1B and to motor M.

Assuming that a strip of film in the form of a roll has been inserted within the film holder 41 on carriage 7, and the knob 85 actuated to advance a portion of the film into alignment with the finger guide 3, the operation is as follows:

The power switch S1 is closed. This completes a circuit from line L1 to line L2 through wire 121, normally closed contact 111 of switch S2, and the coil RC2 of relay R2. Light LT1 is also energized to provide an indication that power is being supplied to the apparatus. Energization of the coil of relay R2 closes contact R2A thereby energizing the coil of solenoid 5. The plunger 35 is pulled within the solenoid coil and pulls carriage 7 into its retracted position. The person having his fingerprint recorded then inserts one finger, for example an index finger, into the guide 3 (assuming the stop 65 has been positioned to receive the index finger) with the palmar portion of the finger facing the film strip.

Switch S3 is then closed to complete a circuit from line L1 to line L2 through wire 121, switch S3 and the coil RC1 of relay R1. Energization of this coil closes relay contact R1A to create a holding circuit through the coil of relay R1. Energization of the coil of relay R1 also closes relay contact R1B which completes a circuit through light LT2 and motor M. Energization of light LT2 indicates to the subject whose finger is located in the finger guide 3 that he should not move his finger until the light LT2 is deenergized. Upon energization of motor M cam 115 begins to rotate. Within two or three seconds, i.e., as soon as follower 119 rides out of notch 117 in cam 115, switch S2 is actuated to open contact 111 and close contact 113. Opening of contact 111 deenergizes the coils of relays R1 and R2 so that the contacts R1A, R1B and R2A return to their normally open positions. Power is now supplied to motor M and light LT2 through wire 121 and the closed contact 113 of switch S2.

The coil of solenoid 5 is deenergized upon opening of contact R2A, thereby permitting springs 45 to pull the carriage toward and against the finger positioned in guide 3. However, dash-pot 51 causes the carriage 7 and film to be moved gently toward and into contact with the finger to avoid any tendency of the subject to move his finger and cause smudging. If the carriage 7 and film were moved quickly into contact with the finger, the person's reflexes might cause him to withdrawn quickly or jerk his finger from the guide 3, thereby smudging the print. Moreover, the springs 45 bias the film carriage 7 and film against the finger with a constant force regardless of the size of the finger and even if the finger is inadvertently moved, e.g., if the subject attempts to press harder against the film, there is an instantaneous increase in pressure leveling out at some new position of the finger to the same force as originally exerted by the finger. The motor continues to run for 30 seconds, i.e., as the cam 115 makes one revolution. At the end of this time the notch 117 is again aligned with the follower 119 and the latter is moved into the notch causing the switch S2 to return to its original position wherein contact 111 is closed and contact 113 is open. The motor M and light LT2 are thereby deenergized, and the coil of relay R2 is energized to cause the contact R2A to close and complete a circuit through the coil of solenoid 5, thereby pulling the plunger 35 and carriage 7 forwardly to their retracted positions.

The index finger is then removed from the guide 3. If it is desired to take a finger-print of another finger, the knob 85 and channel 77 of the advancing mechanism are pulled to the right (upwardly as viewed in FIG. 5) and released. Finger 89 will extend through one of the holes in the film strip and as the carriage is pulled back to its initial position by spring 81, the film will be advanced the equivalent of two frames. A new portion of the film is thus moved into alignment with the finger guide 3.

The density of the fingerprint recorded by the apparatus can then be measured with, for example, the apparatus and by the method disclosed in the co-assigned applications Serial No. 154,467, filed November 24, 1961, and Serial No. 211,519, filed July 23, 1962, both entitled Measurement of Fingerprint Density Apparatus and Method.

While the apparatus is shown as being operated on alternating current, it will be understood that it could be modified to operate just as well on direct curent.

It will be seen that with this apparatus the same contact pressure between the film strip and a finger is obtained regardless of the person operating the apparatus. The period of time during which the finger is in contact with the film is always the same due to the operation of the motor M, cam 115, and the switch S2. Furthermore, the fingerprints recorded by the use of the apparatus are free of smudges due to the finger position guide and the rapidity with which the film is moved away from the finger after the desired time interval has elapsed.

While the push button switch S3 is shown as being mounted on the inclined front wall portion 25 of the housing 1, it will be understood that the switch could be located remotely from the apparatus and connected to the respective electrical components by wires (not shown) leading thereto through a connector 123 located in the rear wall 15 of the housing.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for recording a fingerprint on a strip of film comprising a frame, a guide for positioning the palmar portion of a finger, a film carriage for carrying said film strip, track means connected to said frame and supporting said carriage, means biasing said carriage along said track means toward a fingerprinting position wherein said film strip is adjacent said guide, electrically operated means for opposing said biasing means adapted to move said carriage along said track means to a retracted position and to hold said carriage in its retracted position against said biasing means, said biasing means being adapted to exert a substantially constant biasing force on said carriage, means for energizing said electrically operated means, and timing means adapted first to deenergize said electrically operated means whereby said substantially constant-pressure biasing means moves said carriage along said track means toward said fingerprinting position, said timing means, a predetermined time after deenergizing said electrically operated means, reenergizing said electrically operated means whereby said carriage is returned to its retracted position.

2. Apparatus for recording a fingerprint on a strip of film comprising a frame, a guide for positioning the palmar portion of a finger, a substantially flat film carriage for carrying said film strip, track means connected to said frame and supporting said carriage, means biasing said carriage along said track means toward a fingerprinting position wherein said film strip is adjacent said guide, electrically operated means for opposing said biasing means adapted to move said carriage along said track means to a retracted position and to hold said carriage in its retracted position against said biasing means, said biasing means being adapted to exert a substantially constant biasing force on said carriage, means for energizing said electrically operated means, said guide being adjustable to facilitate proper positioning of the palmar portion of the finger relative to said film strip, and timing means adapted first to deenergize said electrically operated means whereby said substantially constant-pressure biasing means moves said carriage along said track means toward said fingerprinting position, said timing means, a predetermined time after deenergizing said electrically operated means, reenergizing said electrically operated means whereby said carriage is returned to its retracted position.

3. Apparatus for recording a fingerprint on a strip of film as set forth in claim 1 further comprising manually operable means on said frame for advancing said film strip to move a different portion thereof into alignment with said guide, said manually operable means including guide rail means connected to said frame, a channel slidably mounted on said guide rail means, biasing means having one end thereof connected to said frame and the other end connected to said channel, and a finger pivotally connected to said channel adapted to engage said film strip and move the latter when said carriage is moved in one direction along said guide rail means and said film carriage is in its retracted position, said finger riding over said film strip when said channel is moved in an opposite direction.

4. Apparatus for recording a fingerprint on a strip of film as set forth in claim 1 wherein said biasing means comprises a pair of springs adapted to exert a constant biasing force on said carriage and said apparatus further comprises a dash-pot adapted to oppose the biasing force of said springs to reduce the velocity of the carriage as it moves from its retracted position to its fingerprinting position.

References Cited in the file of this patent
UNITED STATES PATENTS

| | | |
|---|---|---|
| 1,225,500 | Rosino | May 8, 1917 |
| 1,855,200 | Reichert | Apr. 26, 1932 |
| 2,782,543 | Soto | Feb. 26, 1957 |
| 3,083,682 | Brutten et al. | Apr. 2, 1963 |